United States Patent
Fang (10) Patent No.: US 10,630,831 B2
(45) Date of Patent: Apr. 21, 2020

(54) PROMPTING INFORMATION OUTPUT METHOD AND APPARATUS

(71) Applicant: BEIJING KINGSOFT INTERNET SECURITY SOFTWARE CO., LTD., Beijing (CN)

(72) Inventor: Jie Fang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/347,643

(22) PCT Filed: Feb. 12, 2018

(86) PCT No.: PCT/CN2018/076421
§ 371 (c)(1),
(2) Date: May 6, 2019

(87) PCT Pub. No.: WO2019/000972
PCT Pub. Date: Jan. 3, 2019

(65) Prior Publication Data
US 2019/0320062 A1    Oct. 17, 2019

(30) Foreign Application Priority Data
Jun. 27, 2017   (CN) .......................... 2017 1 0501985

(51) Int. Cl.
*H04M 1/72*     (2006.01)
*H04M 1/725*    (2006.01)
*G06F 21/12*    (2013.01)
*G06F 21/84*    (2013.01)

(52) U.S. Cl.
CPC ...... *H04M 1/72577* (2013.01); *G06F 21/121* (2013.01); *G06F 21/84* (2013.01); *H04M 1/72569* (2013.01); *H04M 1/72572* (2013.01)

(58) Field of Classification Search
CPC .................................................. H04M 1/725
See application file for complete search history.

(56) References Cited

U.S. PATENT DOCUMENTS

2013/0305324 A1* 11/2013 Alford, Jr. ............. G06F 21/31
                                                              726/5
2015/0199542 A1    7/2015 Wu
2017/0070606 A1*  3/2017 Bandyopadhyay ... G06F 1/1643

FOREIGN PATENT DOCUMENTS

CN          1992762      7/2007
CN          104010088    8/2014
(Continued)

OTHER PUBLICATIONS

International Search Report dated Apr. 28, 2018 by CNIPA as Search Authority for International Application No. PCT/CN2018/076421 filed Feb. 12, 2018 (2 pages) with English translation (2 pages).
(Continued)

*Primary Examiner* — Michael T Vu
(74) *Attorney, Agent, or Firm* — Daniel F. Nesbitt; Hasse & Nesbitt LLC (57) ABSTRACT

A method and an apparatus for outputting warning information, applicable to a mobile terminal, where the mobile terminal is provided with a system lock and an application lock set by a lock screen application, and the method includes: monitoring, via the lock screen application, whether the system lock is successfully unlocked when the mobile terminal is in a locked screen state; launching a camera of the mobile terminal to take a picture when the number of consecutive failed attempts to unlock the system lock reaches a preset threshold; outputting warning information based on the picture. With the solution provided by the embodiments of the present application, when the system lock and the application lock set by the lock screen (Continued)

application are simultaneously set in the mobile terminal, the lock screen application can monitor whether the system lock is successfully unlocked. When the system lock fails to be unlocked, and when the number of failed attempts to unlock the system lock reaches a preset threshold, the camera of the mobile terminal is called to take a picture, and then the warning information is output to prompt the user that the mobile terminal is lost, which facilitates the user to find the mobile terminal through the picture.

16 Claims, 4 Drawing Sheets

(56) References Cited

FOREIGN PATENT DOCUMENTS

| | | |
|---|---|---|
| CN | 104166813 | 11/2014 |
| CN | 104796523 | 7/2015 |
| CN | 105787400 | 7/2016 |
| CN | 106068012 | 11/2016 |
| CN | 106096377 | 11/2016 |
| CN | 106650385 | 5/2017 |
| CN | 106778173 | 5/2017 |
| CN | 106778389 | 9/2018 |

OTHER PUBLICATIONS

Written Opinion dated Apr. 28, 2018 by CNIPA as Search Authority for International Application No. PCT/CN2018/076421 filed Feb. 12, 2018 (4 pages) with WIPO Machine-generated English translation (2 pages).

First Office Action dated Apr. 12, 2019 in corresponding Chinese Application No. 201710501985.X, filed Jun. 27, 2017 (8 pages).

Second Office Action dated Aug. 22, 2019 in corresponding Chinese Application No. 201710501985.X, filed Jun. 27, 2017 (6 pages) w/Chinese Machine Translation (10 pages).

* cited by examiner

PROMPTING INFORMATION OUTPUT METHOD AND APPARATUS

CROSS-REFERENCE TO RELATED APPLICATIONS

The present application is a 371 of International Application No. PCT/CN2018/076421 filed Feb. 12, 2018, entitled "PROMPTING INFORMATION OUTPUT METHOD AND APPARATUS", which is incorporated herein by reference in its entirety.

TECHNICAL FIELD

The present application relates to the field of mobile communication technologies, and in particular, to a method and an apparatus for outputting warning information.

BACKGROUND

When a mobile terminal (such as a mobile phone) uses only an application lock set by a lock screen application to lock the screen, the lock screen application records the number of failed attempts to unlock the application lock. When an attempt to unlock the application lock fails, the lock screen application will determine whether the number of the failed attempts to unlock the application lock reaches a threshold. If the number of the failed attempts has reached the threshold, the lock screen application will start the camera of the mobile terminal to take a picture, output the warning information to prompt that the mobile phone may be lost.

However, in the prior art, in the case that both the system lock and the application lock set by the lock screen application are set in the mobile terminal, if unlocking the system lock fails, the lock screen application cannot output the warning information, regardless of whether the system lock is a fingerprint lock or a password lock, and thus the user cannot timely learn that the mobile terminal is lost.

SUMMARY

The application provides a method and an apparatus for outputting warning information, such that when the mobile terminal is provided with a system lock and an application lock set by a lock screen application, the lock screen application can still output warning information. The specific technical solutions are as follows.

In a first aspect, an embodiment of the present application provides a method for outputting warning information, applicable to a mobile terminal that is provided with a system lock and an application lock set by a lock screen application. The method includes: monitoring, by the lock screen application, whether the system lock is successfully unlocked while the mobile terminal is in a locked screen state; launching a camera of the mobile terminal to take a picture when the number of consecutive failed attempts to unlock the system lock reaches a preset threshold; and outputting warning information based on the picture.

Optionally, before the step of monitoring, by the lock screen application, whether the system lock is successfully unlocked, the method further includes: obtaining a device manager permission of the mobile terminal; and wherein the step of monitoring whether the system lock is successfully unlocked, includes: receiving an unlocking result sent by a system program of the mobile terminal; and determining whether the system lock is successfully unlocked from the unlocking result.

Optionally, the step of obtaining the device manager permission of the mobile terminal includes: displaying a prompt window; receiving a click operation by a user on a permission obtaining button in the prompt window, acquiring and displaying a device manager permission interface of the mobile terminal; and obtaining the device manager permission of the mobile terminal according to an instruction input by the user on the device manager permission interface which allows the lock screen application to obtain the device manager permission.

Optionally, the step of launching the camera of the mobile terminal to take a picture when the number of consecutive failed attempts to unlock the system lock reaches the preset threshold, includes: launching the camera of the mobile terminal to take the picture when the number of consecutive failed attempts to unlock the system lock reaches a preset threshold in a preset duration.

Optionally, if it is monitored that the system lock is successfully unlocked, the method further includes: setting the application lock to an unlocked state.

Optionally, before the step of monitoring whether the system lock is successfully unlocked, the method further includes: determining whether unlocking information matches preset unlocking information upon receiving the unlocking information for the application lock while the mobile terminal is in a locked screen state; if so, determining that the application lock is successfully unlocked, and performing the step of monitoring whether the system lock is successfully unlocked; if not, determining that the application lock fails to be unlocked, recording the number of failed attempts to unlock the application lock, and launching the camera of the mobile terminal to take a picture when the recorded number exceeds a preset threshold; and outputting warning information based on the picture.

Optionally, the step of outputting warning information based on the picture, includes: obtaining location information of the mobile terminal, and outputting the location information and the picture to a preset mailbox or an instant messaging account.

Optionally, the camera of the mobile terminal is specifically a front camera of the mobile terminal.

In a second aspect, an embodiment of the present application further provides an apparatus for outputting warning information, applicable to a mobile terminal that is configured with a system lock and an application lock set by a lock screen application. The apparatus includes: a system lock monitoring module, configured for monitoring, by the lock screen application, whether the system lock is successfully unlocked while the mobile terminal is in a locked screen state; a camera launching module, configured for launching a camera of the mobile terminal to take a picture when the number of consecutive failed attempts to unlock the system lock reaches a preset threshold; and an information outputting module, configured for outputting warning information based on the picture.

Optionally, the apparatus further includes: a permission obtaining module, configured for obtaining a device manager permission of the mobile terminal before the system lock monitoring module monitors whether the system lock is successfully unlocked; wherein the system lock monitoring module includes: a message receiving subunit, configured for receiving an unlocking result sent by a system program of the mobile terminal; and a system lock determination subunit, configured for determining whether the system lock is successfully unlocked from the unlocking result.

Optionally, the permission obtaining module includes: a prompt window display subunit, configured for displaying a prompt window; an operation receiving subunit, configured for receiving a click operation by a user on a permission obtaining button in the prompt window, acquiring and displaying a device manager permission interface of the mobile terminal; and a permission obtaining subunit, configured for obtaining the device manager permission of the mobile terminal according to an instruction input by the user on the device manager permission interface which allows the lock screen application to obtain the device manager permission.

Optionally, the camera launching module is specifically configured for: launching the camera of the mobile terminal to take the picture when the number of consecutive failed attempts to unlock the system lock reaches the preset threshold in a preset duration.

Optionally, the apparatus further includes: an unlocking setting module, configured for setting the application lock to an unlocked state when it is monitored that the system lock is successfully unlocked.

Optionally, the apparatus further includes: an information determination module, configured for determining whether unlocking information matches preset unlocking information upon receiving the unlocking information for the application lock while the mobile terminal is in a locked screen state before the system lock monitoring module monitors whether the system lock is successfully unlocked; and if so, determining that the application lock is successfully unlocked, and triggering the system lock monitoring module, otherwise, determining that the application lock fails to be unlocked, and triggering a counting module; and the counting module, configured for recording the number of failed attempts to unlock the application lock, launching the camera of the mobile terminal to take a picture when the recorded number exceeds a preset threshold, and triggering the information outputting module.

Optionally, the information outputting module is specifically configured for: obtaining location information of the mobile terminal, and outputting the location information and the picture to a preset mailbox or an instant messaging account.

Optionally, the camera of the mobile terminal is specifically a front camera of the mobile terminal.

In a third aspect, an embodiment of the present application further provides a mobile terminal, including a processor, a communication interface, a memory, and a communication bus, wherein the processor, the communication interface, and the memory communicate with each other via the communication bus; the memory is configured to store an executable program; and the processor is configured to implement the method for outputting warning information according to the embodiments of the present application, by executing the program stored in the memory.

In a fourth aspect, an embodiment of the present application further provides a storage medium with an executable program stored thereon. The executable program, when executed by a processor, performs the method for outputting warning information according to the embodiments of the present application.

In a fifth aspect, an embodiment of the present application provides an application program that, when being executed, carries out the method for outputting warning information according to the embodiments of the present application.

In the solution provided by the embodiments of the present application, when both the system lock and the application lock set by the lock screen application are set in the mobile terminal, the lock screen application can monitor whether the system lock is successfully unlocked. When the number of failed attempts to unlock the system lock reaches the preset threshold, the camera of the mobile terminal is launched to take a picture, and then the warning information is output to notify the user that the mobile terminal may be lost, which facilitates the user to find the mobile terminal with the help of the picture.

BRIEF DESCRIPTION OF THE DRAWINGS

In order to describe the technical solutions of embodiments of the present application and of the prior art more clearly, the drawings used in the embodiments and the prior art will briefly described. Obviously, the drawings described below are just for some embodiments of the present application and other drawings may be obtained by those of ordinary skills in the art based on the drawings herein without any creative effort.

DETAILED DESCRIPTION OF THE INVENTION

To make the purposes, technical solutions, and advantages of the present application more clear, the present application will be explained in more details with reference to the accompanying drawings and embodiments. Obviously, the described embodiments are merely some but not all embodiments of the present application. All other embodiments obtained by those of ordinary skill in the art based on the embodiments herein without making creative efforts are within the scope of this application.

In the case that the mobile terminal is provided with a system lock and an application lock set by a lock screen application, in order to enable the lock screen application to still output a warning information to the user, the embodiments of the present application provide a method and an apparatus for outputting warning information, which are applicable to a mobile terminal with a lock screen application stalled thereon. Further, the mobile terminal is provided with a system lock and an application lock set by the lock screen application. Specifically, the mobile terminal may be a mobile phone, a tablet computer, a notebook, or the like.

The method for outputting warning information according to an embodiment of the present application is described in detail below.

Figure 1:
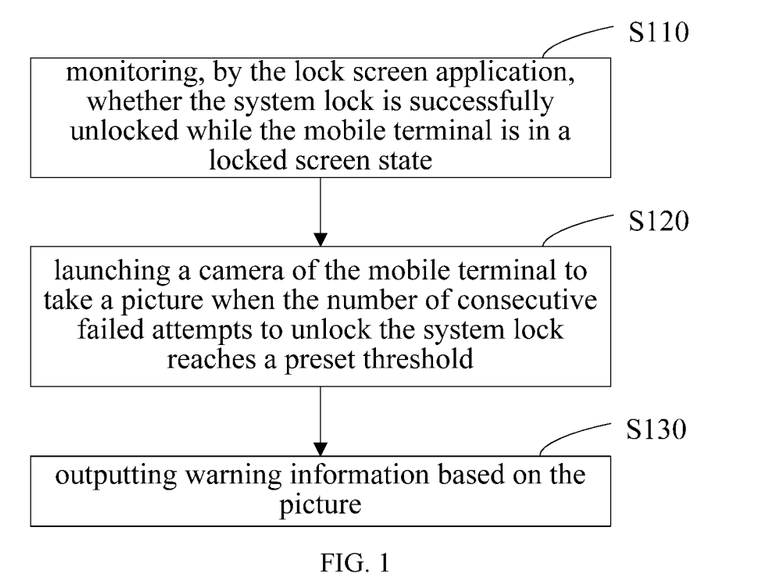
FIG. 1 is a first flowchart of a method for outputting warning information according to an embodiment of the present application.

Referring to FIG. 1, FIG. 1 is a first flowchart of the method for outputting warning information according to an embodiment of the present application. The method is applicable to a mobile terminal that is provided with a system lock and an application lock set by a lock screen application. The system lock means a lock screen set in the system settings interface of the mobile terminal, i.e., a lock screen set for the system of the mobile terminal. An application lock means a lock screen set for applications by a lock screen application installed in the mobile terminal. As shown in FIG. 1, the method includes the following steps.

Step S110, monitoring, by the lock screen application, whether the system lock is successfully unlocked while the mobile terminal is in a locked screen state.

Specifically, when the mobile terminal is provided with the system lock and the application lock set by the lock screen application, the lock screen application monitors whether the system lock is successfully unlocked while the mobile terminal is in a locked screen state. When the lock screen application monitors that unlocking the system lock fails consecutively, the subsequent steps are performed.

Step S120, launching a camera of the mobile terminal to take a picture when the number of consecutive failed attempts to unlock the system lock reaches a preset threshold.

It should be noted that attempts to unlock the system lock fails consecutively means that when the user tries to unlock the system lock of the mobile terminal more than once, at least two unlocking attempts next to each other failed.

Preferably, the launched camera of the mobile terminal is a front camera of the mobile terminal.

Specifically, when the number of consecutive failed attempts to unlock the system lock reaches a preset threshold, it is likely that another user is trying to unlock the system lock of the mobile terminal. At this point, the lock screen application launches the camera of the mobile terminal to take a picture, and the subsequent step S130 is performed.

For example, assuming the preset threshold is 5, when the attempt to unlock the system lock failed 5 times in a row, the lock screen application will launch the front camera of the mobile terminal and snap a picture, and the subsequent step S130 is performed. If the first and second attempts to unlock the system lock fails but the third attempt to unlock is successful, the lock screen application will not launch the camera of the mobile terminal to take a picture.

More specifically, when the mobile terminal is under the control of another user, in order to be able to output the warning information to the user no matter how long the other user tries to unlock the system lock, the number of consecutive failed attempts of unlocking may be set to the number of consecutive failed attempts of unlocking within a preset duration. That is, when the number of consecutive failed attempts of unlocking within the preset duration reaches the preset threshold, the camera of the mobile terminal is launched to take a picture.

The user can set the preset duration according to his/her own needs. For example, the preset duration can be such as 1 hour, 1 day, and 1 year.

By way of example, assuming the preset duration is 1 day and the preset threshold is 3. If the attempt to unlock the system lock fails 3 times in a row in one day, the lock screen application will launch the camera of the mobile terminal and take a picture. For example, in a same day, the other user tries to unlock the system lock at 8 o'clock and fails to unlock the system lock. The other user tries to unlock the system lock at 10 o'clock and the unlocking of the system lock fails. The other user tries to unlock the system lock again at 12 o'clock and fails to unlock the system lock. In this case, the lock screen application will launch the camera of the mobile terminal to take a picture, and the warning information is output based on the captured picture.

Step S130, outputting warning information based on the picture.

After the lock screen application launches the camera of the mobile terminal and the picture is taken, the warning information is output based on the picture. The warning information is used to prompt the user that the mobile terminal is lost, and the other user is trying to unlock the system lock of the mobile terminal. The warning information may include the picture taken by the camera of the mobile terminal, so that the user finds the mobile terminal with the help of the picture.

Additionally, after the camera of the mobile terminal is launched and the picture is taken, the lock screen application can also obtain the location information of the mobile terminal and transmit the obtained location information and the picture to a preset mailbox or an instant messaging account. This facilitates the user to quickly find the mobile terminal with the help of the picture and the location information of the mobile terminal.

The preset mailbox may be set according to the frequency that the user uses mailboxes. For example, the preset mailbox may be a user's common mailbox or a common mailbox of the user's friend. The preset instant messaging account may be such as the user's mobile phone number, QQ account, WeChat account that has been logged in. The present application does not specifically limit the preset mailbox or instant messaging account.

In the embodiments of the present application, when the mobile terminal is provided with both the system lock and the application lock set by the lock screen application, the lock screen application can monitor whether the system lock is successfully unlocked. When unlocking the system lock fails and the number of failed attempts to unlock the system lock reaches the preset threshold, the camera of the mobile terminal is launched and take a picture, and then the warning information is output to prompt the user that the mobile terminal may be lost. This may facilitate the user to find the mobile terminal through the picture.

Further, in an implementation of the embodiment of the present application, when the user uses his own mobile terminal, in order to facilitate the user to quickly unlock the mobile terminal, if the lock screen application monitors that the system lock is successfully unlocked, the method may further include: setting the application lock to an unlocked state.

When the lock screen application detects that the system lock is unlocked successfully, it indicates that the current user is more likely to use the mobile terminal by himself. Therefore, in order to facilitate the user to use the mobile terminal, after the lock screen application detects that the system lock is successfully unlocked, the application lock is set to an unlock state. In this way, the user can use the mobile terminal after unlocking the system lock, instead of unlocking the system lock first and then unlocking the application lock, thereby making it easier for the user to use the mobile terminal.

Further, in another implementation of the embodiment of the present application, when another user uses the mobile terminal, in order to prevent the other user from using the mobile terminal, before the lock screen application monitors whether the system lock is successfully unlocked, the method may further include the following steps: determining whether unlocking information matches preset unlocking information upon receiving the unlocking information for the application lock while the mobile terminal is in a locked screen state; if so, determining that the application lock is successfully unlocked, and performing the step of monitoring whether the system lock is successfully unlocked; if not, determining that the application lock fails to be unlocked, recording the number of failed attempts to unlock the application lock, and launching the camera of the mobile terminal to take a picture when the number exceeds a preset threshold; and outputting warning information based on the picture.

Specifically, when the screen of the mobile terminal is locked, before monitoring whether the system lock is successfully unlocked, the lock screen application determines whether the unlocking information matches the preset unlocking information upon receiving the unlocking information for the application lock. If the received unlocking information matches the preset unlocking information, it indicates that the application lock of the mobile terminal is successfully unlocked. At this point, the mobile terminal performs step S110, i.e., the step of monitoring whether the system lock is successfully unlocked. If the received unlocking information does not match the preset unlocking information, it indicates that the application lock fails to be unlocked, and the mobile terminal records the number of failed attempts to unlock the application lock, and launches the camera of the mobile terminal to take a picture when the recorded number exceeds the preset threshold, and performs step S130, i.e., the step of outputting warning information based on the picture.

It can be understood that when the system lock is a password lock, it can be a character lock or a pattern lock. In a case that the system lock is a character lock, the preset unlocking information is a combination of numbers, a combination of letters, or a combination of numbers and letters. When the system lock is a pattern lock, the preset unlocking information is a pattern.

Further, in another implementation of the embodiment of the present application, in the case that the system lock of the mobile terminal is a password lock, the application lock set by the lock screen application has a higher priority than the system lock. Other users can unlock the system lock only after successfully unlocking the application lock. That is, when the mobile terminal is in the locked screen state, only if the received unlocking information for the application lock matches the preset unlocking information, the lock screen application monitors whether the system lock is unlocked successfully and performs the steps of S120-S130.

Specifically, in the case that the system lock of the mobile terminal is a password lock and the mobile terminal is in the locked screen state, if the received unlocking information for the application lock does not match the preset unlocking information, the lock screen application will determine that the application lock fails to be unlocked, and record the number of the failed attempts to unlock the application lock, and launch the camera of the mobile terminal to take a picture when the recorded number exceeds the preset threshold, and then perform step S130, namely, output warning information based on the picture.

This way, when another user tries to use the mobile terminal, the mobile terminal can be used only after the other user successfully unlocks both the application lock and the system lock. Moreover, as long as the number of failed attempts to unlock the application lock or the system lock reaches the preset threshold, the camera of the mobile terminal will be launched to take a picture, and the warning information is output to the user based on the picture, such that the user can timely find the mobile terminal is lost.

Further, in another implementation of the embodiment of the present application, before performing step S110 monitoring whether the system lock is successfully unlocked, the method further includes: obtaining a device manager permission of the mobile terminal.

After the lock screen application obtains the device manager permission of the mobile terminal, it can avoid that the lock screen application cannot manage and access a system identification module due to system restriction. In other words, it can avoid that the lock screen application cannot monitor whether the system lock is successfully unlocked. For example, when the system lock of the mobile terminal is a password lock, the lock screen application cannot detect the password that the user inputs to unlock the system lock.

After the lock screen application obtains the device manager permission of the mobile terminal, the step of monitoring whether the system lock is successfully unlocked may include: receiving an unlocking result sent by a system program of the mobile terminal after obtaining the device manager permission of the mobile terminal; and determining, according to the unlocking result, whether the system lock is successfully unlocked.

Specifically, when the mobile terminal is in the locked screen state, the lock screen application receives the unlocking result sent by the system program of the mobile terminal. If the unlocking result indicates that the system lock is successfully unlocked, the lock screen application determines that the system lock of the mobile terminal is unlocked successfully; otherwise, the lock screen application determines that the system lock of the mobile terminal fails to be unlocked.

Specifically, the step of obtaining the device manager permission of the mobile terminal includes: displaying a prompt window; receiving a click operation by a user on a permission obtaining button in the prompt window, acquiring and displaying a device manager permission interface of the mobile terminal; and obtaining the device manager permission of the mobile terminal according to an instruction input by the user in the device manager permission interface which allows the lock screen application to have the device manager permission.

Figure 2:
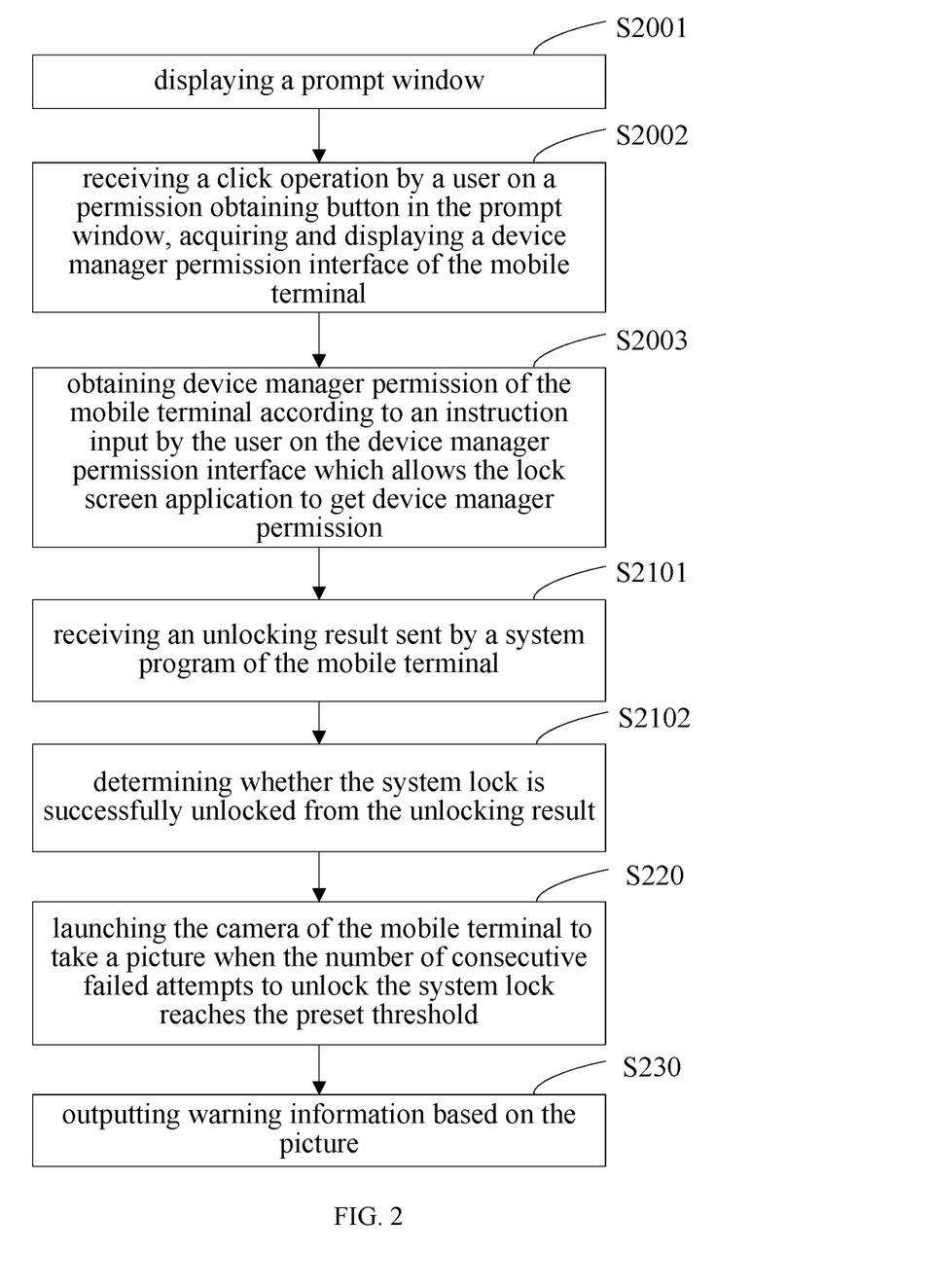
FIG. 2 is a second flowchart of a method for outputting warning information according to an embodiment of the present application.

Referring to FIG. 2, FIG. 2 is a second flowchart of a method for outputting warning information according to an embodiment of the present application. The method is applicable to a mobile terminal that is provided with a system lock and an application lock set by a lock screen application. As shown in FIG. 2, the method includes the following steps:

Step S2001, displaying a prompt window.

Specifically, during the installation of the lock screen application on the mobile terminal or the use of the lock screen application, a prompt window prompting the user to obtain the device manager permission may be displayed.

For example, texts prompting the user to obtain the device manager permissions may be displayed on the prompt window, and a Get permission button and a Cancel button are displayed below the text. When the user clicks the Get permission button, step S2002 is performed to receive the click operation by the user on the Get permission button in the prompt window, and the device manager permission interface of the mobile terminal is acquired and displayed. When the user clicks the Cancel button, the step of obtaining the device manager permission ends.

Step S2002, receiving a click operation by a user on a permission obtaining button in the prompt window, acquiring and displaying a device manager permission interface of the mobile terminal.

When the user clicks the Get permission button in the prompt window, the lock screen application receives the click operation by the user on the Get permission button, and acquires and displays the device manager permission interface of the mobile terminal, such that the user makes settings on the device manager permission interface to allow the lock screen application to get the device manager permission.

Step S2003, obtaining device manager permission of the mobile terminal according to an instruction input by the user on the device manager permission interface which allows the lock screen application to get device manager permission.

Specifically, the device manager permission interface may display an identifier of the lock screen application and an entry to receive an instruction that allows the lock screen application to have the device manager permissions. For example, the entry may be an Allow button. When the user sets the lock screen application to get the device manager permission, the lock screen application is granted the device manager permission of the mobile terminal.

Step S2101, receiving an unlocking result sent by a system program of the mobile terminal.

After the lock screen application obtains the device manager permission of the mobile terminal, it can monitor whether the system lock of the mobile terminal is successfully unlocked. Once the system lock is unlocked, the system program of the mobile terminal broadcasts the unlocking result. The lock screen application receives the unlocking result and determines whether the system lock is successfully unlocked according to the unlocking result.

Step S2102, determining whether the system lock is successfully unlocked from the unlocking result.

Specifically, the unlocking result includes: a message that the unlocking succeeds or the unlocking fails. When the unlocking result indicates that the unlocking succeeds, it is determined that the system lock is successfully unlocked. When the unlocking result indicates that the unlocking fails, it is determined that the system lock fails to be unlocked.

Step S220, launching the camera of the mobile terminal to take a picture when the number of consecutive failed attempts to unlock the system lock reaches the preset threshold.

Step S230, outputting warning information based on the picture.

It should be noted that steps S220-S230 in this embodiment are the same as steps S120-S130, and details will not be described herein again.

In the embodiment of the present application, the lock screen application can obtain the device manager permission of the mobile terminal. When both the system lock and the application lock set by the lock screen application are set in the mobile terminal, the lock screen application can monitor whether the system lock is successfully unlocked. When the number of failed attempts to unlock the system lock reaches the preset threshold, the lock screen application launches the camera of the mobile terminal to take a picture, and then outputs the warning information to notify the user that the mobile terminal may be lost, which facilitates the user to find the mobile terminal with the help of the picture.

Figure 3:
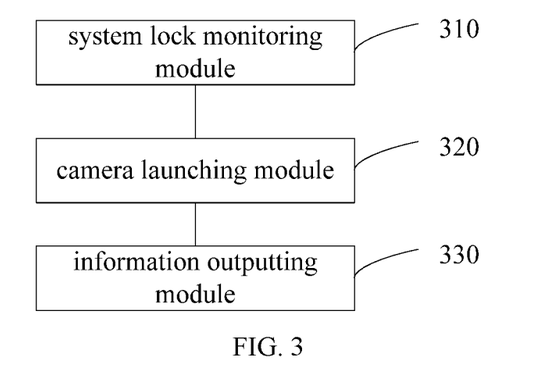
FIG. 3 is a diagram depicting a first structure of an apparatus for outputting warning information according to an embodiment of the present application.

With respect to the method embodiment shown in FIG. 1, an embodiment of the present application further provides an apparatus for outputting warning information, as shown in FIG. 3. FIG. 3 is a diagram depicting a first structure of an apparatus for outputting warning information according to an embodiment of the present application. The apparatus is applicable to a mobile terminal that is provided with a system lock and an application lock set by the lock screen application. As shown in FIG. 3, the apparatus includes: a system lock monitoring module 310, configured for monitoring, by the lock screen application, whether the system lock is successfully unlocked while the mobile terminal is in a locked screen state; a camera launching module 320, configured for launching a camera of the mobile terminal to take a picture when the number of consecutive failed attempts to unlock the system lock reaches a preset threshold; and an information outputting module 330, configured for outputting warning information based on the picture.

Specifically, the apparatus may further include: a permission obtaining module (not shown in FIG. 3), configured for obtaining a device manager permission of the mobile terminal before the system lock monitoring module 310 monitors whether the system lock is successfully unlocked.

More specifically, the system lock monitoring module 310 includes: a message receiving subunit (not shown in FIG. 3), configured for receiving an unlocking result sent by a system program of the mobile terminal; and a system lock determination subunit (not shown in FIG. 3), configured for determining whether the system lock is successfully unlocked from the unlocking result.

More specifically, the permission obtaining module includes: a prompt window display subunit (not shown in FIG. 3), configured for displaying a prompt window; an operation receiving subunit (not shown in FIG. 3), configured for receiving a click operation by a user on a permission obtaining button in the prompt window, acquiring and displaying a device manager permission interface of the mobile terminal; and a permission obtaining subunit (not shown in FIG. 3), configured for obtaining the device manager permission of the mobile terminal according to an instruction input by the user on the device manager permission interface which allows the lock screen application to obtain the device manager permission.

Optionally, the camera launching module 320 is specifically configured for: launching the camera of the mobile terminal to take a picture when the number of consecutive failed attempts to unlock the system lock reaches a preset threshold in a preset duration.

Specifically, the apparatus may further include: an unlocking setting module (not shown in FIG. 3), configured for setting the application lock to an unlocked state when the lock screen application monitors that the system lock is successfully unlocked.

Specifically, the apparatus may further include: an information determination module (not shown in FIG. 3), configured for determining whether unlocking information matches preset unlocking information upon receiving the unlocking information for the application lock while the mobile terminal is in a locked screen state before the system lock monitoring module 310 monitors whether the system lock is successfully unlocked; and if so, determining that the application lock is successfully unlocked, and triggering the system lock monitoring module 310, otherwise, determining that the application lock fails to be unlocked, and triggering a counting module (not shown in FIG. 3); the counting module (not shown in FIG. 3), configured for recording the number of failed attempts to unlock the application lock, launching the camera of the mobile terminal to take a picture when the recorded number exceeds a preset threshold, and triggering the information outputting module 330.

Preferably, the information outputting module 330 is specifically configured for: obtaining location information of the mobile terminal, and outputting the location information and the picture to a preset mailbox or an instant messaging account.

Preferably, the camera of the mobile terminal is specifically a front camera of the mobile terminal.

With the apparatus provided by the embodiment of the present application, when both the system lock and the application lock set by the lock screen application are set in the mobile terminal, the lock screen application can monitor whether the system lock is successfully unlocked. When the system lock fails to be unlocked and the number of failed attempts to unlock the system lock reaches a preset threshold, the camera of the mobile terminal is launched to take a picture, and then the warning information is output to prompt the user that the mobile terminal is lost, which facilitates the user to find the mobile terminal with the help of the picture.

Figure 4:
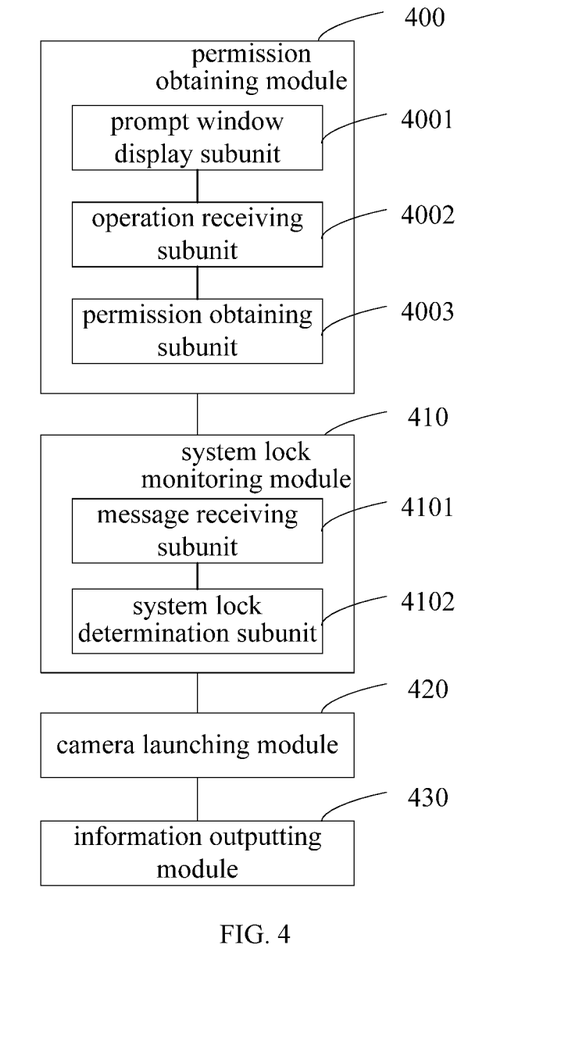
FIG. 4 is a diagram depicting a second structure of an apparatus for outputting warning information according to an embodiment of the present application.

With respect to the method embodiment shown in FIG. 2, an embodiment of the present application further provides an apparatus for outputting warning information, as shown in FIG. 4. FIG. 4 is a diagram of a second structure of an apparatus for outputting warning information according to an embodiment of the present application. The apparatus is applicable to a mobile terminal that is provided with a system lock and an application lock set by the lock screen application. As shown in FIG. 4, the apparatus includes: a permission obtaining module 400, configured for obtaining a device manager permission of the mobile terminal.

Specifically, the permission obtaining module 400 includes: a prompt window display subunit 4001, configured for displaying a prompt window; an operation receiving subunit 4002, configured for receiving a click operation by a user on a permission obtaining button in the prompt window, acquiring and displaying a device manager permission interface of the mobile terminal; and a permission obtaining subunit 4003, configured for obtaining the device manager permission of the mobile terminal according to an instruction input by the user on the device manager permission interface which allows the lock screen application to obtain the device manager permission.

A system lock monitoring module 410, configured for monitoring whether the system lock is successfully unlocked while the lock screen application is in a locked screen state.

Specifically, the system lock monitoring module 410 includes: a message receiving subunit 4101, configured for receiving an unlocking result sent by a system program of the mobile terminal; and a system lock determination subunit 4102, configured for determining whether the system lock is successfully unlocked from the unlocking result.

A camera launching module 420, configured for launching a camera of the mobile terminal to take a picture when the number of consecutive failed attempts to unlock the system lock reaches a preset threshold.

An information outputting module 430, configured for outputting warning information based on the picture.

With the apparatus provided by the embodiment of the present application, when both the system lock and the application lock set by the lock screen application are set in the mobile terminal, the lock screen application can monitor whether the system lock is successfully unlocked. When the system lock fails to be unlocked and the number of failed attempts to unlock the system lock reaches the preset threshold, the camera of the mobile terminal is launched to take a picture, and then the warning information is output to prompt the user that the mobile terminal is lost, which facilitates the user to find the mobile terminal with the help of the picture.

Figure 5:
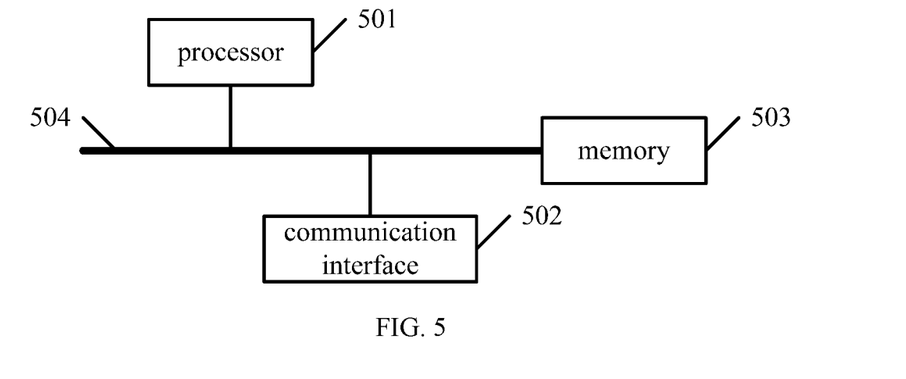
FIG. 5 is a diagram depicting the structure of a mobile terminal according to an embodiment of the present application.

With respect to the above method embodiments, an embodiment of the present application further discloses a mobile terminal. As shown in FIG. 5, the mobile terminal include a processor 501, a communication interface 502, a memory 503, and a communication bus 504. The processor 501, the communication interface 502, and the memory 503 communicate with each other via the communication bus 504.

The memory 503 is configured to store a computer program.

The processor 501 is configured to carry out the method for outputting warning information according to the method embodiments of the present application, by executing the program stored on the memory 503.

The communication bus in the above mobile terminal may be a Peripheral Component Interconnect (PCI) bus or an Extended Industry Standard Architecture (EISA) bus. The communication bus can include an address bus, a data bus, a control bus, and the like. For ease of representation, only one thick line is shown in the figure, but it does not mean that there is only one bus or one type of bus.

The communication interface is used for communication between the above mobile terminal and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including such as a central processing unit (CPU), a network processor (NP); or may be a digital signal processing (DSP), an application specific integrated circuit (ASIC), field-programmable gate array (FPGA) or other programmable logic device, discrete gate or transistor logic device, and discrete hardware component.

An embodiment of the present application further provides a storage medium with an executable program stored thereon. The program implements, when executed by a processor, the method for outputting the warning information according to the method embodiments of the present application.

Corresponding to the above method embodiments, an embodiment of the present application further provides an application program that, when executed, performs the steps of implementing the method for outputting warning information according to the foregoing method embodiments.

It should be emphasized that, methods involved in the mobile terminal and the storage medium embodiments are basically similar to the foregoing method embodiments, thus, the description of the former is relatively simple. The relevant parts can be referred to the description of the method embodiments.

The above description is only for the preferred embodiments of the present application, and is not intended to limit the present application. Any modifications, equivalent substitutions, improvements made within the spirit and scope of the present application are intended to be included within the scope of the present application.

The invention claimed is:

1. A method for outputting warning information, applicable to a mobile terminal that is configured with a system lock and an application lock set by a lock screen application, comprising:
obtaining a device manager permission of the mobile terminal;
monitoring, by the lock screen application, whether the system lock is successfully unlocked while the mobile terminal is in a locked screen state, comprises the steps of:

receiving an unlocking result sent by a system program of the mobile terminal; and determining whether the system lock is successfully unlocked from the unlocking result;

launching a camera of the mobile terminal to take a picture when the number of consecutive failed attempts to unlock the system lock reaches a preset threshold; and outputting warning information based on the picture.

2. The method of claim 1, wherein the step of obtaining the device manager permission of the mobile terminal comprises:

displaying a prompt window;

receiving a click operation by a user on a permission obtaining button in the prompt window, acquiring and displaying a device manager permission interface of the mobile terminal; and obtaining the device manager permission of the mobile terminal according to an instruction input by the user on the device manager permission interface which allows the lock screen application to obtain the device manager pelf fission.

3. The method of claim 1, wherein the step of launching the camera of the mobile terminal to take the picture when the number of consecutive failed attempts to unlock the system lock reaches the preset threshold, comprises:

launching the camera of the mobile terminal to take the picture when the number of consecutive failed attempts to unlock the system lock reaches the preset threshold in a preset duration.

4. The method of claim 1, wherein if it is monitored that the system lock is unlocked successfully, the method further comprises:

setting the application lock to an unlocked state.

5. The method of claim 1, wherein before the step of monitoring whether the system lock is successfully unlocked, the method further comprises:

determining whether unlocking information matches preset unlocking information upon receiving the unlocking information for the application lock while the mobile terminal is in a locked screen state;

if so, determining that the application lock is successfully unlocked, and performing the step of monitoring whether the system lock is successfully unlocked;

if not, determining that the application lock fails to be unlocked, recording the number of failed attempts to unlock the application lock, and launching the camera of the mobile terminal to take a picture when the recorded number exceeds a preset threshold; and outputting warning information based on the picture.

6. The method of claim 1, wherein the step of outputting the warning information based on the picture comprises:

obtaining location information of the mobile terminal, and outputting the location information and the picture to a preset mailbox or an instant messaging account.

7. The method of claim 1, wherein the camera of the mobile terminal is a front camera of the mobile terminal.

8. An apparatus for outputting warning information, applicable to a mobile terminal that is configured with a system lock and an application lock set by a lock screen application, comprising:

a system lock monitoring module, configured for monitoring, by the lock screen application, whether the system lock is successfully unlocked while the mobile terminal is in a locked screen state, the system lock monitoring module comprising:

a message receiving subunit, configured for receiving an unlocking result sent by a system program of the mobile terminal; and a system lock determination subunit, configured for determining whether the system lock is successfully unlocked from the unlocking result;

a camera launching module, configured for launching a camera of the mobile terminal to take a picture when the number of consecutive failed attempts to unlock the system lock reaches a preset threshold;

an information outputting module, configured for outputting warning information based on the picture; and a permission obtaining module, configured for obtaining a device manager permission of the mobile terminal before the system lock monitoring module monitors whether the system lock is successfully unlocked.

9. The apparatus of claim 8, wherein the permission obtaining module comprises:

a prompt window display subunit, configured for displaying a prompt window;

an operation receiving subunit, configured for receiving a click operation by a user on a permission obtaining button in the prompt window, acquiring and displaying a device manager permission interface of the mobile terminal; and a permission obtaining subunit, configured for obtaining the device manager permission of the mobile terminal according to an instruction input by the user on the device manager permission interface which allows the lock screen application to obtain the device manager permission.

10. The apparatus of claim 8, wherein the camera launching module is further configured for:

launching the camera of the mobile terminal to take the picture when the number of consecutive failed attempts to unlock the system lock reaches the preset threshold in a preset duration.

11. The apparatus of claim 8, wherein the apparatus further comprises:

an unlocking setting module, configured for setting the application lock to an unlocked state when it is monitored that the system lock is successfully unlocked.

12. The apparatus of claim 8, wherein the apparatus further comprises:

an information determination module, configured for, before the system lock monitoring module monitors whether the system lock is successfully unlocked, determining whether unlocking information matches preset unlocking information upon receiving the unlocking information for the application lock while the mobile terminal is in a locked screen state; and if so, triggering the system lock monitoring module, otherwise, triggering a counting module; and the counting module, configured for recording the number of failed attempts to unlock the application lock, launching the camera of the mobile terminal to take a picture when the recorded number exceeds a preset threshold, and triggering the information outputting module.

13. The apparatus of claim 8, wherein the information outputting module is further configured for:

obtaining location information of the mobile terminal, and outputting the location information and the picture to a preset mailbox or an instant messaging account.

14. The apparatus of claim 8, wherein the camera of the mobile terminal is a front camera of the mobile terminal.

15. A mobile terminal, comprising: a processor, a communication interface, a memory, and a communication bus, wherein the processor, the communication interface, and the memory communicate with each other via the communication bus;

the memory is configured to store an executable program; and the processor is configured for, by executing the program stored on the memory, carrying out steps of the method of claim 1.

16. A non-transitory storage medium, wherein the storage medium stores an executable program that, when executed by a processor, implements steps of the method of claim 1.

* * * * *

UNITED STATES PATENT AND TRADEMARK OFFICE
CERTIFICATE OF CORRECTION

PATENT NO. : 10,630,831 B2
APPLICATION NO. : 16/347643
DATED : April 21, 2020
INVENTOR(S) : Jie Fang Page 1 of 1

It is certified that error appears in the above-identified patent and that said Letters Patent is hereby corrected as shown below:

In the Claims

Column 13, Claim 2, Line 23, delete "pelf fission" and insert --permission--.

Signed and Sealed this
Twenty-third Day of June, 2020

Andrei Iancu
*Director of the United States Patent and Trademark Office*